United States Patent

Chen

[11] Patent Number: 5,943,708
[45] Date of Patent: Aug. 31, 1999

[54] ADJUSTABLE TANK BALL ASSEMBLY FOR A TWO-STEP FLUSHING CONTROL TYPE BALLFLOAT TOILET

[76] Inventor: Ching-Tse Chen, No. 27, Chin Hsiang Street, Tu Cheng City, Taipei County, Taiwan

[21] Appl. No.: 09/124,113

[22] Filed: Jul. 29, 1998

[51] Int. Cl.⁶ .................................................. E03D 1/14
[52] U.S. Cl. ...................................... 4/325; 4/393; 4/404
[58] Field of Search .............................. 4/324, 325, 392, 4/393, 395, 403, 404

[56] References Cited

U.S. PATENT DOCUMENTS

| | | | |
|---|---|---|---|
| 2,511,545 | 6/1950 | Roselair | 4/404 |
| 5,181,282 | 1/1993 | Comparetti | 4/404 |
| 5,400,444 | 3/1995 | Boyer et al. | 4/325 |

Primary Examiner—Robert M. Fetsuga
Attorney, Agent, or Firm—Dougherty & Troxell

[57] ABSTRACT

An adjustable tank ball assembly mounted in the water tank of a ballfloat toilet controlled by two trip handles to close/open the water discharging outlet of the valve seat of the water tank of the ballfloat toilet between a full-discharge flushing mode and a water-saving flushing mode, the adjustable tank ball assembly including a ball shell having a bottom center hole, a valve rod coupled to the ball shell and pulled by a first trip handle to lift the ball shell from the valve seat so as to achieve the full-discharge flushing mode, and an actuating plate driven by a second trip handle to force down the valve rod in opening the bottom center hole of the ball shell so as to achieve the water-saving flushing node.

2 Claims, 6 Drawing Sheets

5,943,708

ADJUSTABLE TANK BALL ASSEMBLY FOR A TWO-STEP FLUSHING CONTROL TYPE BALLFLOAT TOILET

BACKGROUND AND SUMMARY OF THE INVENTION

The present invention relates to a tank ball assembly for a two-step flushing control type ballfloat toilet, and more particularly to an adjustable tank ball assembly which can be conveniently adjusted to change the discharging volume of water at the water-saving flushing mode.

In order to save the consumption of flushing water, various two-step flushing control type ballfloat toilets have been developed. These ballfloat toilets provide two flushing modes, namely, the full-discharge flushing mode and the water-saving flushing mode. However, these ballfloat toilets do not allow the user to adjust the discharging volume of water under the water-saving flushing mode.

The present invention provides a tank ball assembly for a two-step flushing control type ballfloat toilet which permits the user to conveniently adjust the discharging volume of water under the water-saving flushing mode. According to one aspect of the present invention, the adjustable tank ball assembly is mounted in the water tank of a ballfloat toilet and controlled by two trip handles to close/open the water discharging outlet of the valve seat of the water tank of the ballfloat toilet between a full-discharge flushing mode and a water-saving flushing mode, the adjustable tank ball assembly comprising a ball shell having a bottom center hole, a valve rod coupled to the ball shell and pulled by a first trip handle to lift the ball shell from the valve seat so as to achieve the full-discharge flushing mode, and an actuating plate driven by a second trip handle to force down the valve rod in opening the bottom center hole of the ball shell so as to achieve the water-saving flushing mode. According to another aspect of the present invention, the valve rod can rotated on its own axis in the bottom center hole to adjust the water flow rate passing from the water tank to the inside of the ball shell. According to still another aspect of the present invention, index means is provided at the valve rod and the shell cover of the ball shell for indicating the angular position of the valve rod.

DETAILED DESCRIPTION OF THE PREFERRED EMBODIMENT

Figure 1:
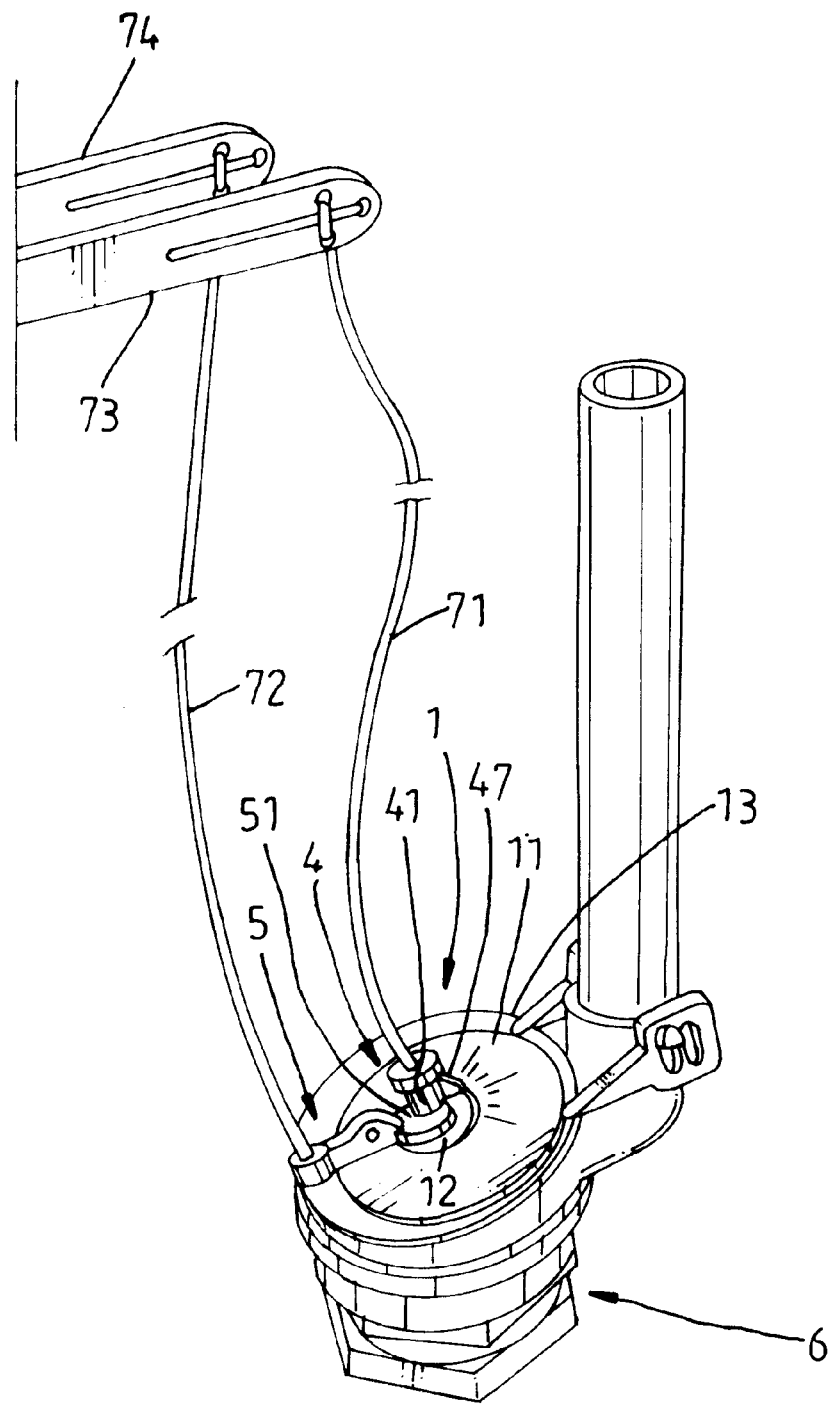
FIG. 1 shows the tank ball assembly mounted on the valve seat and connected to the trip handles according to the present invention.

Referring to FIG. 1, an adjustable tank ball assembly is mounted in the water tank of a ballfloat toilet, connected to two trip handles 73, 74 by two lift wires 71, 72 and controlled by the trip handles 73, 74 to close/open the water discharging outlet of the valve seat 6 of the water tank of the ballfloat toilet at two alternate flushing modes, namely the water-saving flushing mode and the full-discharge flushing mode.

Figure 2:
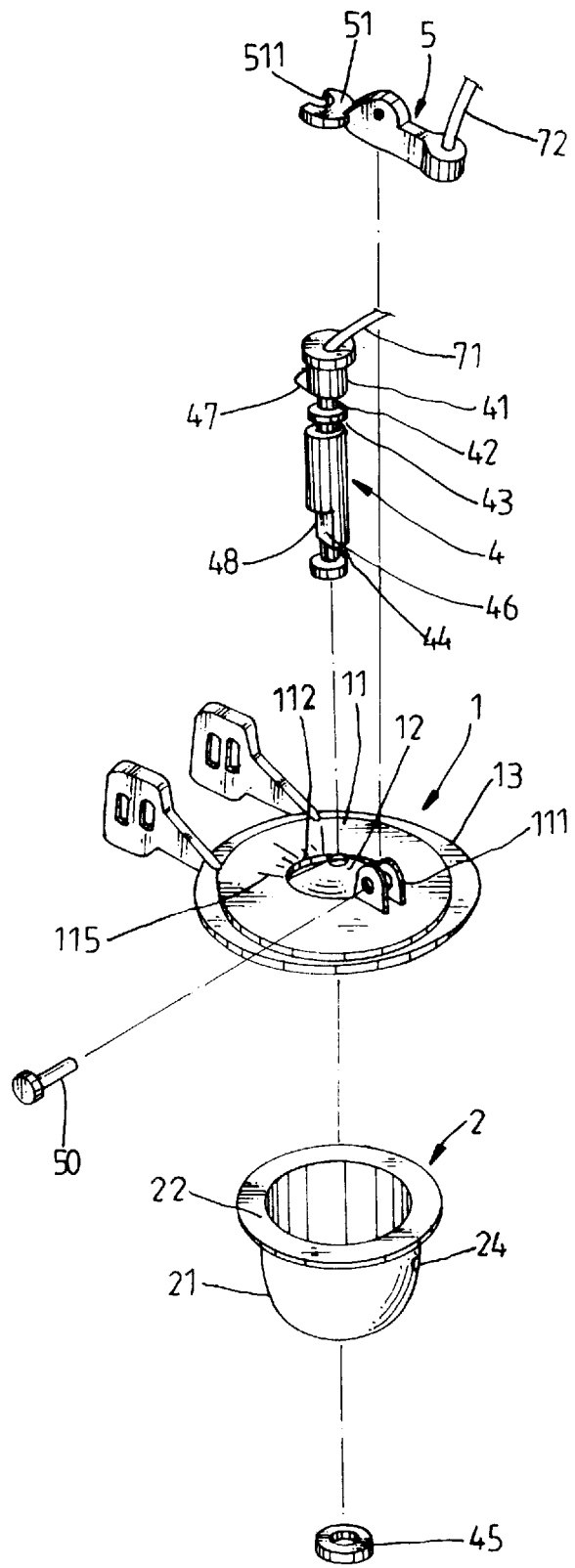
FIG. 2 is an exploded view of the tank ball assembly according to the present invention.
Figure 3:
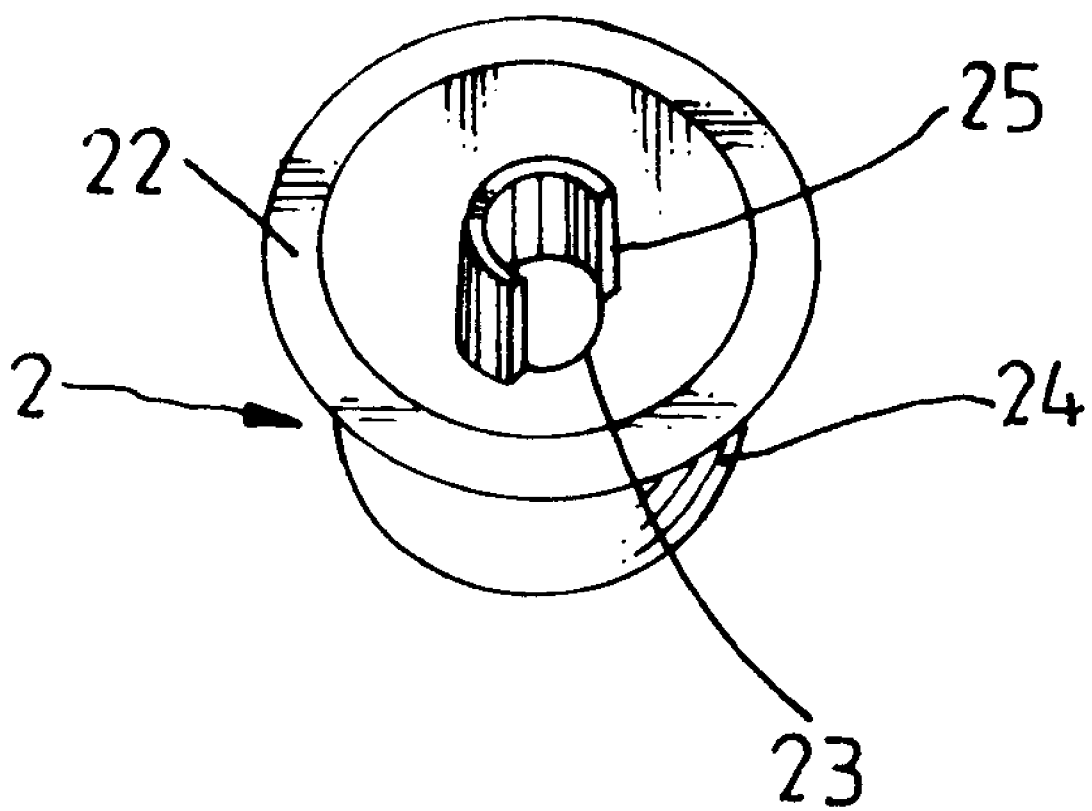
FIG. 3 is a perspective view of the ball shell showing the semicircular upright inside flange raised around the bottom center hole.
Figure 4:
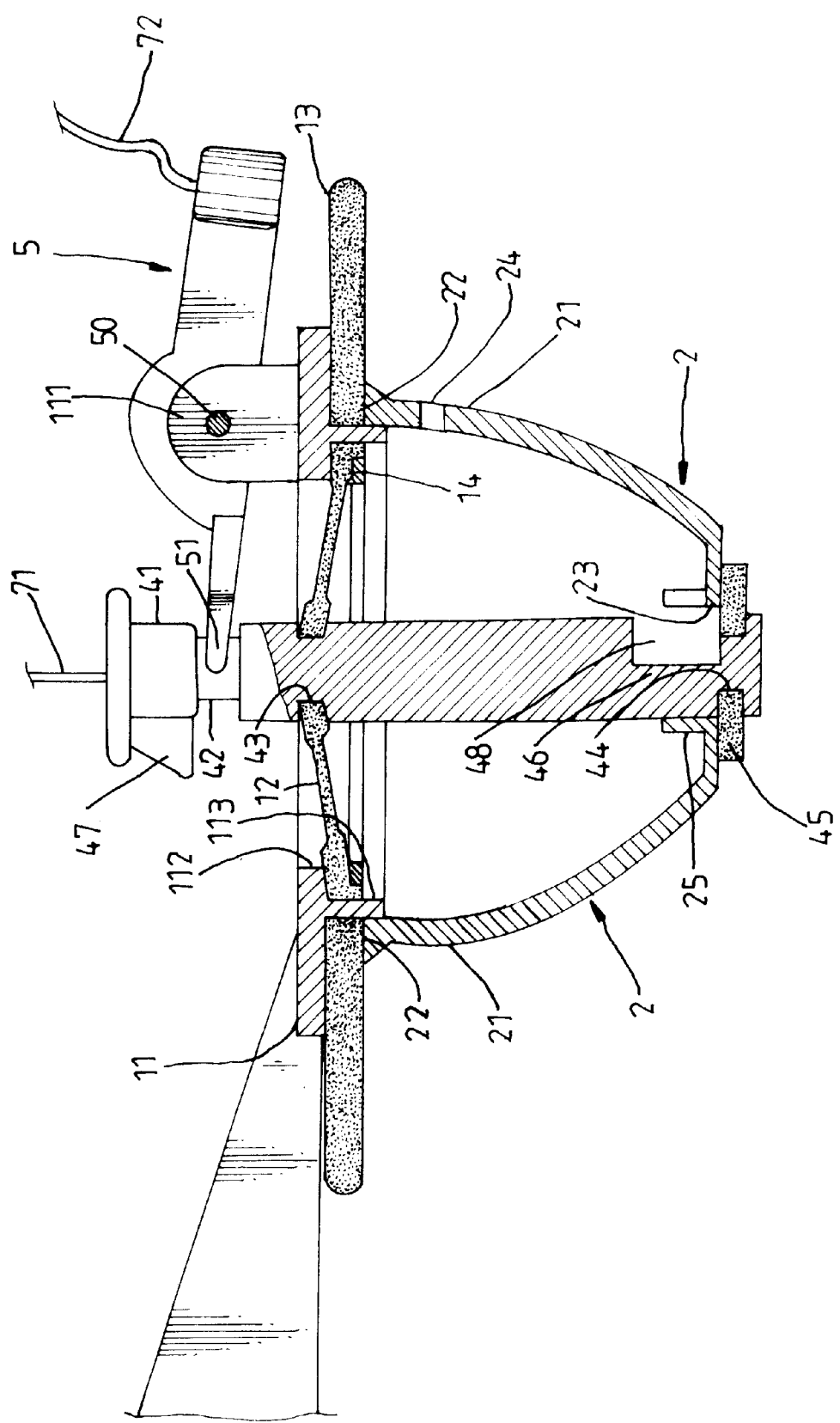
FIG. 4 is a sectional view of the present invention, showing the valve rod lifted with the first lift wire.

Referring to FIGS. 2, 3 and 4 and FIG. 1 again, the adjustable tank ball assembly is comprised of a ball shell 2, a shell cover 1, a valve rod 4, and an actuating plate 5.

The ball shell 2 comprises a cup-like shell body 21, a rim 22 horizontally outwardly raised around the periphery of the opened top side of the shell body 21, a bottom center hole 23 at the center of the bottom side of the shell body 21, a semicircular upright inside flange 25 raised from the inside wall of the shell body 21 at the bottom around the bottom center hole 23, and an air vent 24 at the periphery of the shell body 21.

The shell cover 1 comprised of a flat, annular base plate 13, a cover plate 11, a flexible valve flap 12, and a packing ring 14. The cover plate 11 has a circular center hole 112, a downward annular flange 113 perpendicularly downwardly raised from the bottom side wall thereof and spaced around the circular center hole 112 and engaged into the inside wall of the cup-like shell body 21 of the ball shell 2, and a pair of parallel lugs 111 raised from the top side wall thereof. The annular flange 113 and retained between the rim 22 of the ball shell 2 and the bottom side wall of the cover plate 11. The valve flap 12 curves upwards, and is mounted in the circular center hole 112 of the cover plate 11 and secured in place by the packing ring 14.

The valve rod 4 comprises a head 41 at the top end thereof, which is connected to one lift wire namely the first lift wire 71, a first annular coupling groove 42 spaced below the head 41 around the periphery for engagement with the actuating plate 5, a second annular coupling groove 43 spaced below the first annular coupling groove 42 for engagement with the valve flap 12 of the shell cover 1, a third annular coupling groove 44 spaced below the second annular coupling groove 43 around the periphery near the bottom end thereof and extended out of the bottom center hole 23 of the shell body 21 of the ball shell 2. Further, a notch 48 is provided at the periphery of the valve rod 4 above the third annular coupling groove 44, such that a part of the valve rod 4 forms a semicircular rod section 46. A gasket ring 45 is mounted in the third annular coupling groove 44 of the valve rod 4, and disposed outside the shell body 21 of the ball shell 2.

The actuating plate 5 is pivotably connected between the lugs 111 of the cover plate 11 by a pivot pin 50, having a near end connected one lift wire namely the second lift wire 72 and a forked 511 front end 51 engaged into the first annular coupling groove 42 of the valve rod 4.

Figure 5:
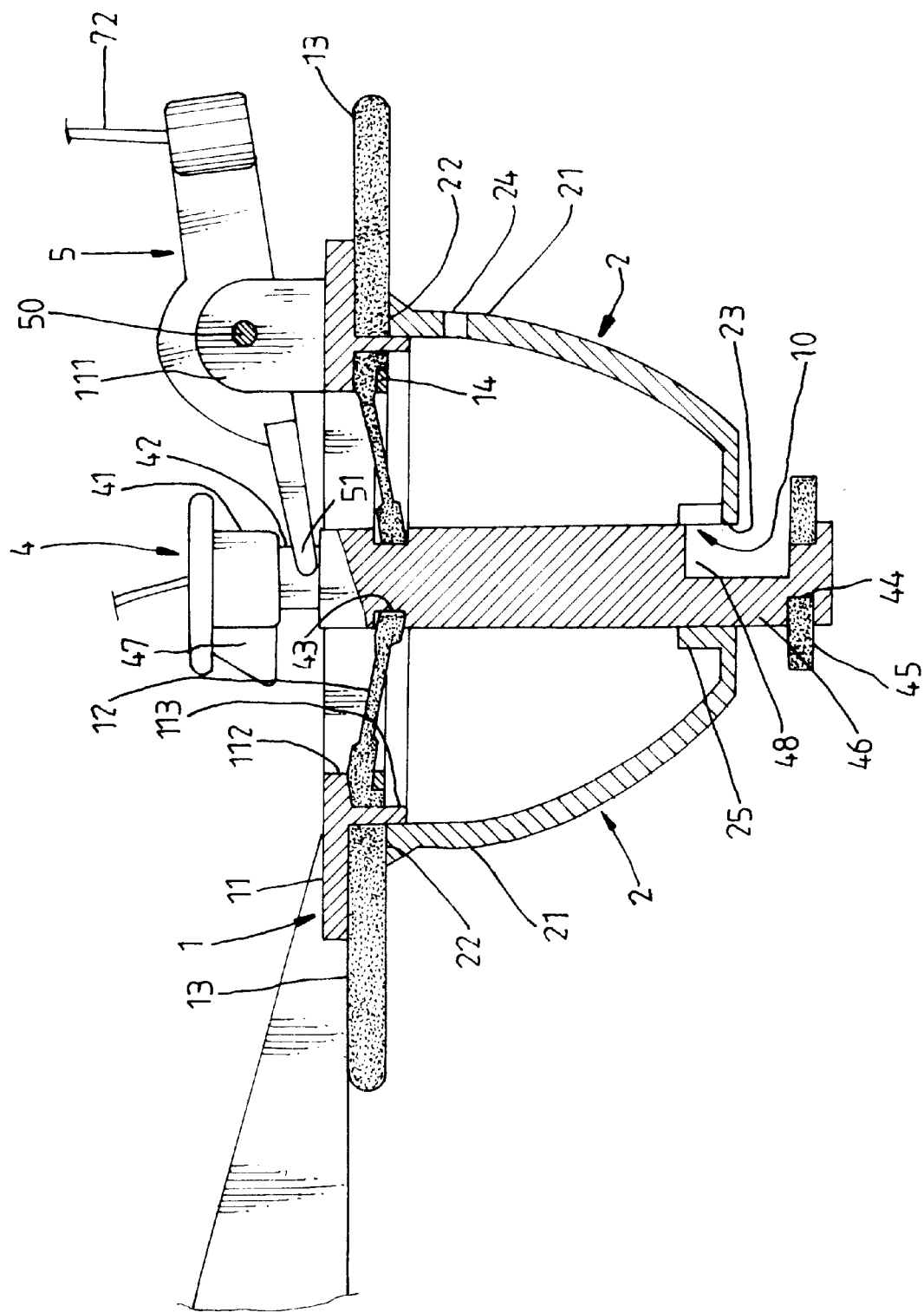
FIG. 5 is another sectional view of the present invention showing the actuating plate turned about the pivot pin; the valve rod forced downwards, the water passage opened.

Referring to FIG. 5 and FIGS. 1 and 4 again, when the first lift wire 71 is lifted, the actuating plate 5 is turned about the pivot pin 50 to force the valve rod 4 downwards. When the valve rod 4 is forced downwards, see FIG. 5, the valve flap 12 is pulled to curve downwards, and at the same time the gasket ring 45 is moved with the valve rod 4 downwardly away from the bottom center hole 23 of the shell body 21 to open the water passage 10, enabling water to flow from the water tank of the ballfloat toilet to the inside of the shell body 21 of the ball shell 2 (see FIG. 5). When water flows to the inside of the shell body 21 of the ball shell 2, same volume of air is forced out of the shell body 21 of the ball shell 2 through the air vent 24. When a certain amount of water is accumulated in the shell body 21 of the ball shell 2, the ball shell 2 is forced downwards to close the valve seat 6. Thus, a water-saving flushing operation is down. When the second lift wire 72 is lifted (see FIG. 4), the gasket ring 45 is moved upwards with the valve rod 4 to close the bottom center hole 23 of the shell body 21 of the ball shell 2 and to further carry the shell body 21 of the ball shell 2 upwards from the valve seat 6, enabling water to be completely discharged out of the water tank through the water discharging outlet of the valve seat 6.

Figure 6:
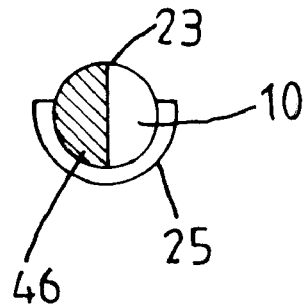
FIG. 6 is a sectional view of a part of the present invention, showing the location of the water passage relative to the semicircular rod section of the valve rod and the semicircular inside flange of the shell body.
Figure 7:
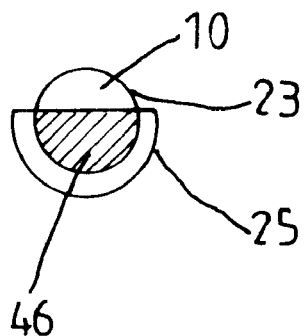
FIG. 7 is similar to FIG. 6 but showing the angular position of the valve rod adjusted.

Referring to FIGS. 6 and 7 and FIGS. from 3 through 5 again, the aforesaid water passage 10 is defined by the semicircular upright inside flange 25 of the shell body 21 of the ball shell 2 and the semicircular rod section 46 of the valve rod 4. When the valve rod 4 is rotated in the bottom center hole 23 of the shell body 21 of the ball shell 2 relative to the semicircular upright inside flange 25, the size of the water passage 10 is relatively changed. By adjusting the size of the water passage 10 to control the flow rate of water into the shell body 21 of the ball shell 2, the lowering speed of the ball shell 2 is relatively controlled, and therefore the water discharging volume at the water-saving flushing mode is relatively controlled.

Referring to FIG. 2 again, an index 47 is provided at the head 41 of the valve rod 4, and graduations 115 are provided at the cover plate 11 of the shell cover 1 for indicating the angular position of the valve rod 4 (indes 47) relative to the semicircular upright inside flange 25 of the shell body 21 of the ball shell 2.

I claim:

1. An adjustable tank ball assembly mounted in the water tank of a ballfloat toilet, connected to a first trip handle by a lift wire and a second trip handle by a second lift wire, and controlled by the first trip handle and the second trip handle to close/open the water discharging outlet of the valve seat of the water tank of the ballfloat toilet between a full-discharge flushing mode and a water-saving flusing mode, the adjustable tank ball assembly comprising:

a ball shell moved in and out of the valve seat of the ballfloat toilet, said ball shell comprising a cup-like shell body, said cup-like shell body comprising a rim horizontally outwardly raised around the periphery of an opened top side thereof, a bottom center hole at the center of a bottom side thereof, a semicircular upright inside flange raised from an inside wall thereof said bottom center hole, and an air vent at the periphery near the opened top side;

a shell cover covered on the opened top side of said cup-like shell body, said shell cover comprised of a flat, annular base plate, a cover plate, a flexible valve flap, and a packing ring, said cover plate comprising a circular center hole, a downward annular flange perpendicularly downwardly raised from a bottom side wall thereof and spaced around said circular center hole and engaged into the inside wall of said cup-like shell body of said ball shell, a pair of parallel lugs raised from a top side wall thereof, and a pivot pin connected between said parallel lugs, said annular base plate being mounted around the downward annular flange of said cover plate and retained between the rim of said ball shell and the bottom side wall of said cover plate, said valve flap being mounted in the circular center hole of said cover plate and secured in place by said packing ring;

a valve rod fastened to a center hole at said valve flap of said shell cover and inserted through the bottom center hole of said shell body of said ball shell, said valve rod comprising a head at a top end thereof, which is connected to the first trip handle by the first lift wire, a first annular coupling groove spaced below said head around the periphery, a second annular coupling groove spaced below said first annular coupling groove and engaged with the valve flap of said shell cover, a third annular coupling groove spaced below said second annular coupling groove around the periphery near a bottom end thereof and extended out of the bottom center hole of said shell body of said ball shell, a semicircular rod section suspended between said second annular coupling groove and said third annular coupling groove and defining with the semicircular upright inside flange and bottom center hole of said shell body of said ball shell a water passage for guiding water from the water tank of the ballfloat toilet into the inside of said ball shell, the size of said water passage being relatively changed when said valve rod is rotated in the center hole on said valve flap and the bottom center hole of said shell body of said ball shell;

an actuating plate turned about the pivot pin between the lugs of said cover plate, said actuating plate having a rear end connected to the second lift wire and a forked front end connected to the first annular coupling groove of said valve rod; and a gasket ring mounted in the third annular coupling groove of said valve rod and disposed outside the shell body of said ball shell, said gasket ring being forced to close said water passage when said valve rod is lifted by said first lift wire, said gasket ring being moved downwards with said valve rod to open said water passage when the second lift wire is lifted to turn said actuating plate about said pivot pin.

2. The adjustable tank ball assembly of claim 1 wherein an index and graduations are respectively provided at the head of said valve rod and the top side wall of said cover plate of said shell cover for indicating the angular position of said valve rod relative to the semicircular upright inside flange of said shell body.

* * * * *